(12) United States Patent
Endo

(10) Patent No.: US 8,488,678 B2
(45) Date of Patent: Jul. 16, 2013

(54) MOVING IMAGE ENCODING APPARATUS AND MOVING IMAGE ENCODING METHOD

(75) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 12/679,618

(22) PCT Filed: Mar. 25, 2009

(86) PCT No.: PCT/JP2009/056771
§ 371 (c)(1),
(2), (4) Date: Mar. 23, 2010

(87) PCT Pub. No.: WO2009/123248
PCT Pub. Date: Oct. 8, 2009

(65) Prior Publication Data
US 2011/0013695 A1  Jan. 20, 2011

(30) Foreign Application Priority Data

Apr. 1, 2008 (JP) .................................. 2008-095436
Jun. 5, 2008 (JP) .................................. 2008-148324

(51) Int. Cl.
*H04N 7/12* (2006.01)
*H04B 1/66* (2006.01)

(52) U.S. Cl.
USPC ................................................... 375/240.16

(58) Field of Classification Search
USPC ......................................... 375/240.02–240.24
See application file for complete search history.

(56) References Cited

U.S. PATENT DOCUMENTS

| 6,269,174 | B1 * | 7/2001 | Koba et al. ................... 382/107 |
| 6,987,866 | B2 * | 1/2006 | Hu ................................. 382/107 |
| 7,705,884 | B2 * | 4/2010 | Pinto et al. ............... 348/208.99 |
| 8,189,671 | B2 * | 5/2012 | Wang ........................ 375/240.16 |
| 2006/0017814 | A1 * | 1/2006 | Pinto et al. ................. 348/208.4 |
| 2006/0204043 | A1 | 9/2006 | Takei |
| 2008/0126278 | A1 * | 5/2008 | Bronstein et al. ............... 706/17 |

FOREIGN PATENT DOCUMENTS

| JP | 2003-284091 A | 10/2003 |
| JP | 2005-176073 A | 6/2005 |
| JP | 2006-135734 A | 5/2006 |
| JP | 2006-165840 A | 6/2006 |
| JP | 2006-254370 A | 9/2006 |

* cited by examiner

Primary Examiner — Nhon Diep
(74) Attorney, Agent, or Firm — Cowan, Liebowitz & Latman, P.C.

(57) ABSTRACT

A moving image encoding apparatus comprises a motion vector search unit for dividing a screen into encoding blocks, dividing each encoding block into motion compensation blocks, and performing a motion vector search by referencing a past or future image with respect to a motion compensation block targeted for encoding, and an encoding unit for encoding a difference value between the motion compensation block and a prediction image that is based on the motion vector. The motion vector search unit sets a plurality of block types for each encoding block, performs rough motion vector search using a reduced image for each block type, computes an evaluation value for each block type based on the motion vectors, and determines whether to set a division method of the block type for which the highest evaluation value was obtained as a motion compensation block division method for a motion vector search in detail.

15 Claims, 10 Drawing Sheets

16×16

16×8

8×16

8×8

MOVING IMAGE ENCODING APPARATUS AND MOVING IMAGE ENCODING METHOD

CROSS-REFERENCE TO RELATED APPLICATIONS

This application is a national stage application of International Application No. PCT/JP2009/056771, filed Mar. 25, 2009, whose benefit is claimed and which claims the benefit of Japanese Patent Applications No. 2008-095436, filed Apr. 1, 2008 and 2008-148324, filed Jun. 5, 2008, whose benefit is also claimed.

TECHNICAL FIELD

The present invention relates to a moving image encoding apparatus and a moving image encoding method, and more particularly to a favorable technique for use in real-time encoding.

BACKGROUND ART

Heretofore, a digital video camera is known as a recording apparatus that shoots a subject, compression encodes moving image data thus obtained, and records the compression encoded moving image data to a recording medium, for example. In recent years, recording media used in such a recording apparatus have shifted from conventional magnetic tape towards disk media, semiconductor memories, and the like that are superior in terms of random accessibility and high access speeds. However, disk media and semiconductor memories generally have low-cost performance relative to storage capacity compared with magnetic tape. Thus, moving image data needs to be compression encoded with higher efficiency when using a disk medium or a semiconductor memory as a recording medium.

Digital video cameras that handle high definition (HD) video having greater information volume are also becoming more widespread given the expected high image quality. Higher efficiency compression encoding of moving image data is also desired from this viewpoint. MPEG-2 is the compression encoding system normally used for compression encoding moving image data with high efficiency.

Further, in recent years, higher efficiency compression encoding systems have been developed following further improvements in recording time to recording media and the increased need for lower bit rate encoding for mobile terminals with limited recording capacity. The H.264|AVC method is one of these. While requiring more operations for encoding and decoding in comparison to the conventional MPEG-2 and MPEG-4 methods, the H.264|AVC method is known to realize high encoding efficiency. Note that hereinafter "H.264|AVC method" will be abbreviated as "H.264".

With H.264, various devices have been tried in order to raise encoding efficiency. Variable block size motion compensation is one example. This involves subdividing a macroblock (encoding block) constituting a unit of coding to form macroblock partitions (motion compensation blocks), and performing motion compensation in units of motion compensation blocks. With H.264, using variable block size motion compensation enables more accurate motion compensation in comparison to a conventional compression encoding system such as MPEG-2 that performs motion compensation with a single block size. An "encoding apparatus" proposed in Japanese Patent Laid-Open No. 2006-135734 is given as an exemplary invention that adaptively uses variable block size motion compensation.

However, with H.264, making encoding block size selectable as a result of variable block size motion compensation led to an increase in operation load for determining block size. That is, a motion vector search process needs to be performed for all motion compensation blocks that can be set with respect to an encoding block to be encoded, and an optimal block size selected. In view of this, it has been proposed to use information acquired when an image targeted for encoding is shot to reduce the amount of operations related to block size selection, as a way of determining an appropriate block size as simply as possible (e.g., see Japanese Patent Laid-Open No. 2006-254370)

With H.264, as noted above, a large amount of operations are required to perform motion vector searches and determine a motion compensation block division method, in order to perform motion compensation block segmentation resulting from variable block size motion compensation. Thus, a processor capable of extremely fast operations is required, particularly in the case where real-time encoding is performed such as with the above digital video camera, leading to an increase in device cost and power consumption.

Also, with the configuration of Japanese Patent Laid-Open No. 2006-254370, the camera unit needs to output information acquired when an image is shot to the encoding unit, and a mechanism is required on the encoding unit side for inputting and processing the information supplied from the camera unit during encoding.

DISCLOSURE OF INVENTION

The present invention has been made in consideration of the above situation, and has as its object to reduce the amount of operations for performing a motion vector search and determining a motion compensation block division method.

According to the present invention, the foregoing object is attained by providing a moving image encoding apparatus comprising: motion vector search means for dividing a screen into encoding blocks, each constituting a unit of coding, dividing the encoding block into one or more motion compensation blocks, each constituting a unit of motion compensation, and performing a motion vector search by referencing, as a reference image, a past or future image with respect to a motion compensation block targeted for encoding; and encoding means for encoding a difference value between the motion compensation block targeted for encoding and a prediction image that is based on a motion vector obtained by the motion vector search means, wherein the motion vector search means includes: setting means for setting a plurality of motion compensation block types with respect to the encoding block, when roughly performing a motion vector search using a reduced image of the reference image; evaluation value computation means for performing the motion vector search using the reduced image, for each of the plurality of motion compensation block types set by the setting means, and computing an evaluation value for each of the plurality of motion compensation block types, based on the plurality of obtained motion vectors; and determination means for determining, according to a reliability of a most highly evaluated evaluation value out of the plurality of evaluation values computed by the evaluation value computation means, whether to set a division method of the motion compensation block type for which the most highly evaluated evaluation value was obtained as a motion compensation block division method for when performing a motion vector search in detail using the reference image.

According to the present invention, the foregoing object is also attained by providing a moving image encoding method comprising: a motion vector search step of dividing a screen into encoding blocks, each constituting a unit of coding, dividing the encoding block into one or more motion compensation blocks, each constituting a unit of motion compensation, and performing a motion vector search by referencing, as a reference image, a past or future image with respect to a motion compensation block targeted for encoding, and encoding a difference value between the motion compensation block targeted for encoding and a prediction image that is based on the motion vector obtained in the motion vector search, wherein the motion vector search step includes: a setting step of setting a plurality of motion compensation block types with respect to the encoding block, when roughly performing a motion vector search using a reduced image of the reference image; an evaluation value computing step of performing the motion vector search using the reduced image, for each of the plurality of motion compensation block types set in the setting step, and computing an evaluation value for each of the plurality of motion compensation block types, based on the plurality of obtained motion vectors; and a determination step of determining, according to a reliability of a most highly evaluated evaluation value out of the plurality of evaluation values computed in the evaluation value computation step, whether to set a division method of the motion compensation block type for which the most highly evaluated evaluation value was obtained as a motion compensation block division method for when performing a motion vector search in detail using the reference image.

Further, according to the present invention, the foregoing object is also attained by providing a moving image encoding apparatus for dividing a screen into encoding blocks, each constituting a unit of coding, dividing the encoding block into one or more motion compensation blocks, each constituting a unit of motion compensation, and performing a motion vector search with reference to at least a past image with respect to the motion compensation blocks included in an encoding block targeted for encoding, comprising: dividing means for dividing the encoding block targeted for encoding using a set plurality of different division methods, and forming motion compensation blocks that correspond to the division methods; motion vector search means for performing a motion vector search according to a search accuracy, with respect to each of the motion compensation blocks formed by the dividing means using the plurality of different division methods; setting means for selecting at least one of the division methods based on a result of the motion vector search according to the search accuracy performed by the motion vector search means, setting the selected division method to the dividing means, setting at least one prescribed division method out of the plurality of different division methods with respect to the dividing means, and setting the search accuracy to a higher search accuracy; and control means for performing control so as to sequentially repeat an operation of setting the division methods and the search accuracy by the setting means, and an operation of performing the motion vector search by the motion vector search means according to the set division methods and search accuracy, wherein the controlling means, if judging that the higher search accuracy set by the setting means as a result of the repeated operations is a preset search accuracy, selects one of the selected division method selected based on the search result and the prescribed division method, based on a result of the motion vector search performed by the motion vector search means, and determines a motion vector obtained as a result of the motion vector search performed using the one selected division method as a final motion vector.

Furthermore, according to the present invention, the foregoing object is also attained by providing a moving image encoding method for dividing a screen into encoding blocks, each constituting a unit of coding, dividing the encoding block into one or more motion compensation blocks, each constituting a unit of motion compensation, and performing a motion vector search with reference to at least a past image with respect to the motion compensation blocks included in an encoding block targeted for encoding, comprising: a dividing step of dividing the encoding block targeted for encoding using a set plurality of different division methods, and forming motion compensation blocks that correspond to the division methods; a motion vector search step of performing a motion vector search according to a search accuracy, with respect to each of the motion compensation blocks formed in the dividing step using the plurality of different division methods; a setting step of selecting at least one of the division methods based on a result of the motion vector search according to the search accuracy performed in the motion vector search step, setting the selected division method with respect to the dividing step, setting at least one prescribed division method out of the plurality of different division methods for the dividing step, and setting the search accuracy to a higher search accuracy; and a control step of performing control so as to sequentially repeat an operation of setting the division methods and the search accuracy in the setting step, and an operation of performing the motion vector search in the motion vector search step according to the set division methods and search accuracy, wherein in the controlling step, if judging that the higher search accuracy set in the setting step as a result of the repeated operations is a preset search accuracy, one of the selected division method selected based on the search result and the prescribed division method is selected based on a result of the motion vector search performed in the motion vector search step, and a motion vector obtained as a result of the motion vector search performed using the one selected division method is determined as a final motion vector.

Further features of the present invention will become apparent from the following description of exemplary embodiments (with reference to the attached drawings).

BEST MODE FOR CARRYING OUT THE INVENTION

Preferred embodiments of the present invention will be described in detail in accordance with the accompanying drawings.

Figure 1:
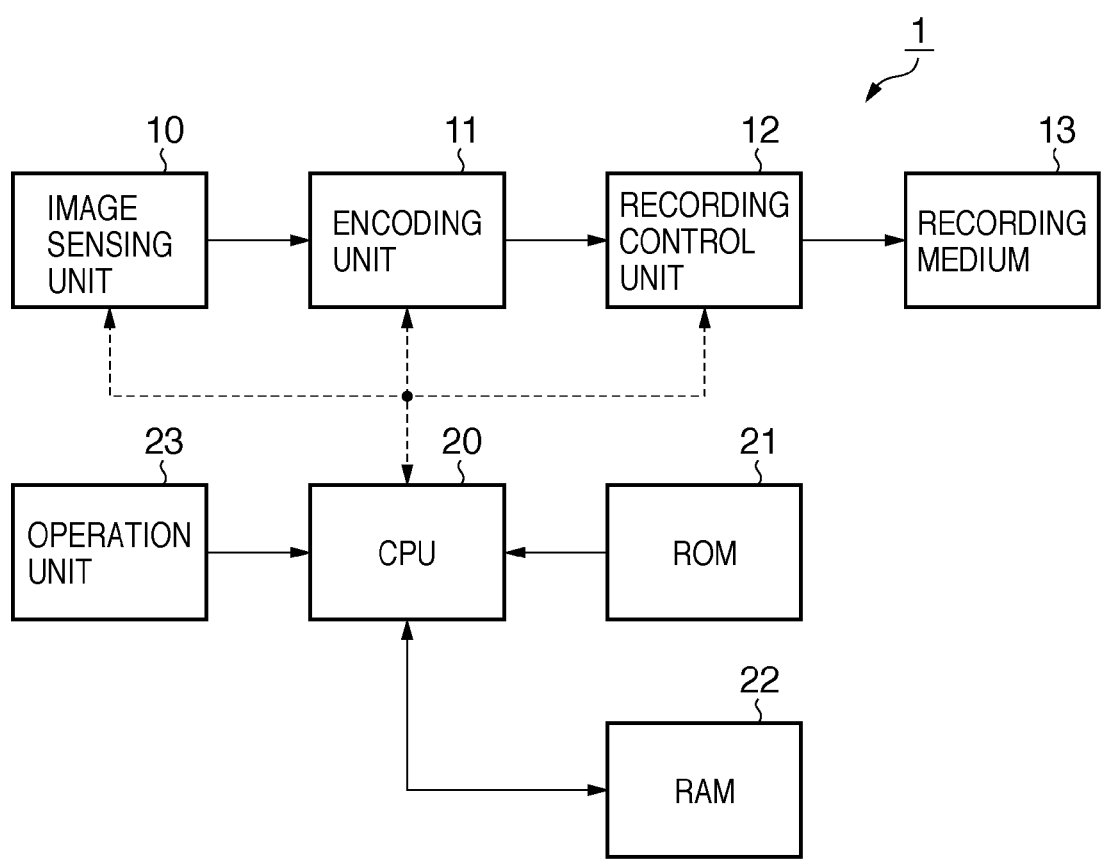
FIG. 1 is a block diagram schematically showing an exemplary configuration of a digital video camera capable of applying the present invention.

FIG. 1 schematically shows an exemplary configuration of a digital video camera 1 capable of applying the present invention. An image sensing unit 10 includes an optical system, an imaging device such as CCD or CMOS sensor that converts to electric signals light incident via the optical system, and a signal processing unit that performs prescribed processing on an image signal output from the image sensing device and outputs the processed image signal as moving image data. The moving image data output from the image sensing unit 10 is supplied to an encoding unit 11 to which the present invention is applied, and undergoes compression encoding using H.264.

Compression encoded moving image data is output from the encoding unit 11 and supplied to a recording control unit 12. The recording control unit 12 controls an operation of recording data to a recording medium 13 constituted by a disk medium or a semiconductor memory. The recording control unit 12 performs an error correction encoding process and a recording/encoding process tailored to the type of recording medium 13 on compressed moving image data that is supplied to obtain recording data. The recording control unit 12 writes the recording data to the recording medium 13 in data units compatible with the recording medium 13 via a buffer memory.

A CPU 20 controls operation of the entire digital video camera 1. That is, the CPU 20 operates using a RAM 22 as a work memory and controls operation of the image sensing unit 10, the encoding unit 11 and the recording control unit 12, in accordance with a program prestored in a ROM 21. An operation unit 23 is provided with an operator for a user to operate the digital video camera 1, and a display device for a user to check operation of the digital video camera 1. The CPU 20 controls operation of the digital video camera 1, according to user operations on the operation unit 23.

Figure 2:
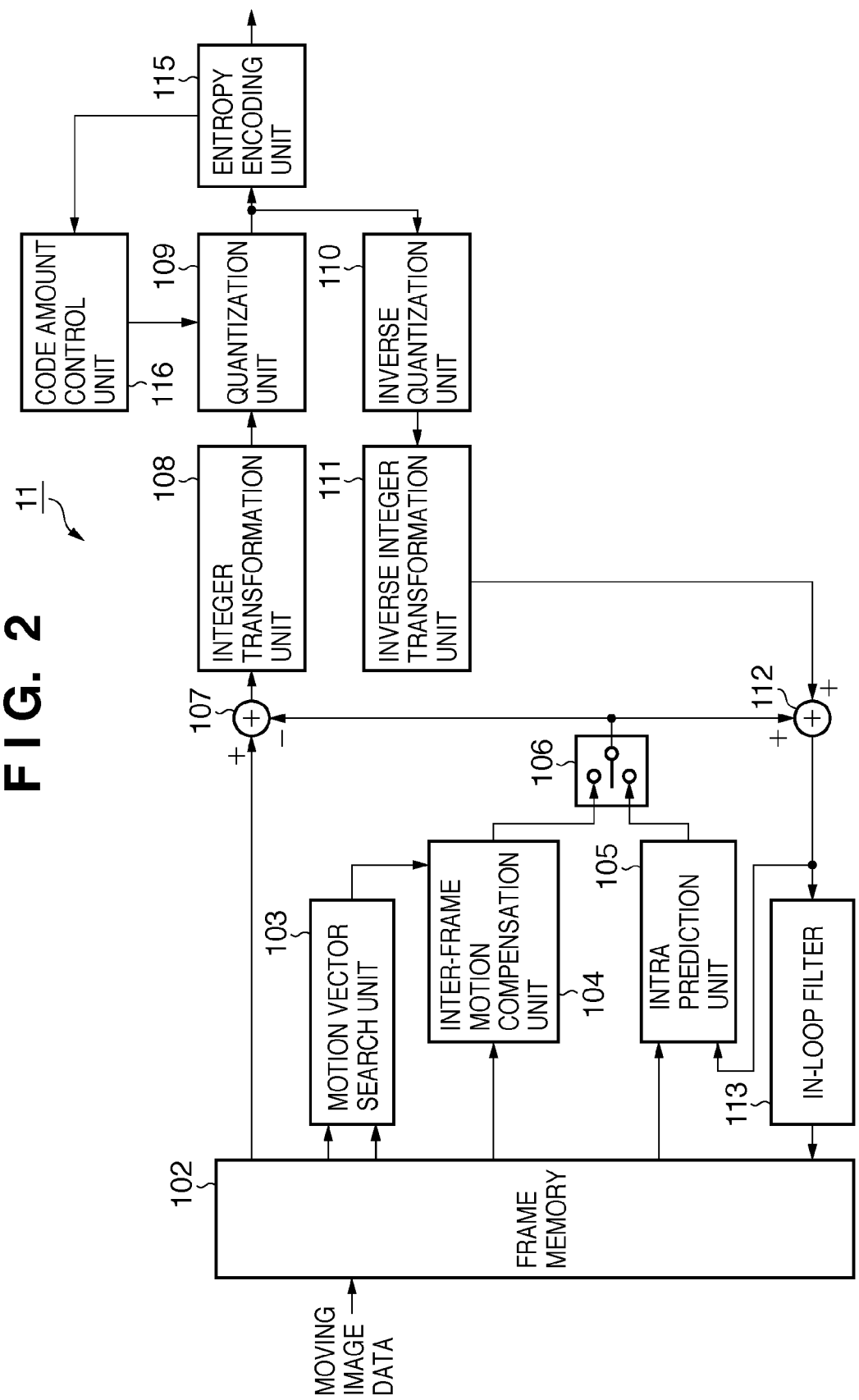
FIG. 2 is a block diagram schematically showing a configuration of an encoding unit according to embodiments of the present invention.

FIG. 2 is a block diagram showing an exemplary configuration of the encoding unit 11 according to the embodiments of the present invention. The encoding unit 11 divides the screen into an encoding block constituting a unit of coding, and divides the encoding block into a motion compensation block constituting a unit of motion compensation.

The encoding unit 11 then performs motion vector detection with reference, as a reference image, to a past or future image with respect to a motion compensation block targeted for encoding, and encodes a difference value between the motion compensation block targeted for encoding and a prediction image that is based on a detected motion vector. In the present embodiment, the motion vector search is performed while changing the resolution stepwise from a low resolution to a high resolution.

In FIG. 2, the encoding unit 11 includes a frame memory 102, a motion vector search unit 103, an inter-frame motion compensation unit 104, an intra prediction unit 105, and a switch 106.

The encoding unit 11 further includes a subtractor 107, an integer transformation unit 108, a quantization unit 109, an inverse quantization unit 110, an inverse integer transformation unit 111, an adder 112, an in-loop filter 113, an entropy encoding unit 115, and a code amount control unit 116.

The encoding unit 11 performs compression encoding on the supplied moving image data by the Hadamard transformation and orthogonal transform using integer precision discrete cosine transform (DCT), and by intra-frame predictive encoding and inter-frame predictive encoding using motion compensation. Hereinafter, the Hadamard transform and orthogonal transform using integer precision DCT will be referred to as integer transform, while intra-frame predictive encoding and inter-frame predictive encoding will be referred to respectively as intra-encoding and inter-encoding. Operation of the encoding unit 11 is controlled by the CPU 20.

P pictures for performing prediction with a single reference frame with respect to a unit of motion compensation (MC block) and B pictures for performing prediction with up two previous or subsequent reference images in time-series with respect to an MC block are formed using inter-encoding. I pictures are formed using intra-encoding. Further, with inter-frame predictive encoding, moving image data is encoded as data having a group of pictures (GOP) structure in which these I, P and B pictures are arrayed in a prescribed order.

For example, in the case where the encoding unit 11 forms a GOP with fifteen frames including one I picture, four P pictures and ten B pictures, the picture types are allocated in the following order to frames to be input to the encoding unit 11. Note that the subscript denotes the input order or the display order.

$B_1B_2I_3B_4B_5P_6B_7B_8P_9B_{10}B_{11}P_{12}B_{13}B_{14}P_{15}$

Here, since the B pictures are for performing predictive encoding using a past picture and a future picture in time-series, encoding is performed in the following order after interchanging the order of the B pictures with the I and P pictures. Note that the $B_1$ and $B_2$ pictures following the $I_3$ picture are prediction encoded using the $I_3$ picture and the $P_{15}$ picture in the previous GOP.

$I_3B_1B_2P_6B_4B_5P_9B_7B_8P_{12}B_{10}B_{11}P_{15}B_{13}B_{14}$

Moving image data supplied from the image sensing unit 10 is stored in the frame memory 102 in the order in which the frames were shot in time-series, that is, in order of first frame, second frame, third frame and so on. Moving image data is read out in encoding order per frame from the frame memory 102, in the order in which the frames will be encoded, such as third frame, first frame, second frame and so on, for example. The order in which the frames are encoded differs from the order in which the frames are input so as to enable prediction with temporally future frames (backward prediction).

In the case of performing intra-encoding, the image data of a block targeted for encoding in a frame of moving image data corresponding to an I picture is read out from the frame memory 102, and supplied respectively to the intra prediction unit 105 and the subtraction input terminal of the subtractor 107. Here, a frame is assumed to correspond to a single screen of moving image data. That is, an encoding target block is one of the blocks obtained when a single screen of moving image data is divided into a prescribed number of blocks.

The intra prediction unit 105 performs block matching with the encoding target block with respect to each of a plurality of prediction images generated from reconstructed images supplied from the adder 112 that are positioned in proximity to the encoding target block within the same frame. The intra prediction unit 105 then selects, from the plurality of prediction images, an intra prediction image with the highest correlation resulting from the block matching. The intra prediction image is output to the switch 106 selected on the intra prediction unit 105 side, in response to the execution of intra-encoding.

On the other hand, in the case of performing inter-encoding, the image data of the block targeted for encoding is read out from the frame memory 102, and supplied to the motion vector search unit 103. Also, a reference image is read out from the frame memory 102, and supplied to the motion vector search unit 103. The reference image can be selected from a plurality of pictures. The motion vector search unit 103 performs motion vector detection based on the image data of the block targeted for encoding and the reference image. At this time, the motion vector search unit 103 performs a motion vector search after dividing the encoding target block into one or more partitions using a process that will be described below. The motion vector detected by the motion vector search unit 103 is supplied to the inter-frame motion compensation unit 104.

The inter-frame motion compensation unit 104 performs motion compensation based on the motion vector supplied from the motion vector search unit 103 and the reference image read out from the frame memory 102, and generates an inter prediction image using inter prediction. The inter prediction image is output to the switch 106 selected on the inter-frame motion compensation unit 104 side, in response to the execution of inter-encoding.

The output of the switch 106 is supplied to the subtraction input terminal of the subtractor 107 and the one of the input terminals of the adder 112. The subtractor 107 outputs the difference information of pixel values between the encoding target block supplied from the frame memory 102 and the inter prediction image or intra prediction image supplied from the switch 106. This difference information is supplied to the integer transformation unit 108, where it undergoes integer transformation using the Hadamard transform or integer precision DCT, then is quantized in the quantization unit 109 based on a prescribed quantization coefficient. The quantized transformation coefficient constituting the output of the quantization unit 109 undergoes entropy encoding in the entropy encoding unit 115, and is output from this encoding unit 11.

The quantization coefficient in the quantization unit 109 is computed by the code amount control unit 116 based on feedback on the code amount produced by the entropy encoding unit 115 or the like. The quantized transformation coefficient constituting the output of the quantization unit 109 is decoded by being inverse quantized in the inverse quantization unit 110 and undergoing an inverse integer transformation process in the inverse integer transformation unit 111, then is added in the adder 112 to the inter prediction image or intra prediction image output from the switch 106 to form a reconstructed image. This reconstructed image is supplied to the intra prediction unit 105 and used in generating the above intra prediction images.

Also, the reconstructed image output from the adder 112 undergoes a coding noise reduction process by the in-loop filter 113, then is stored in the frame memory 102 as a reference image to be used when performing inter-encoding.

First Embodiment

Next, operation of the motion vector search unit 103 in a first embodiment will be described in detail. In the first embodiment, a partition division method (described below) is derived by a two-stage process involving a rough search for performing a motion vector search with a low search accuracy and a fine search for performing the search after increasing the search accuracy. A motion vector corresponding to an obtained partition is then determined as a final motion vector search result.

Figure 3:
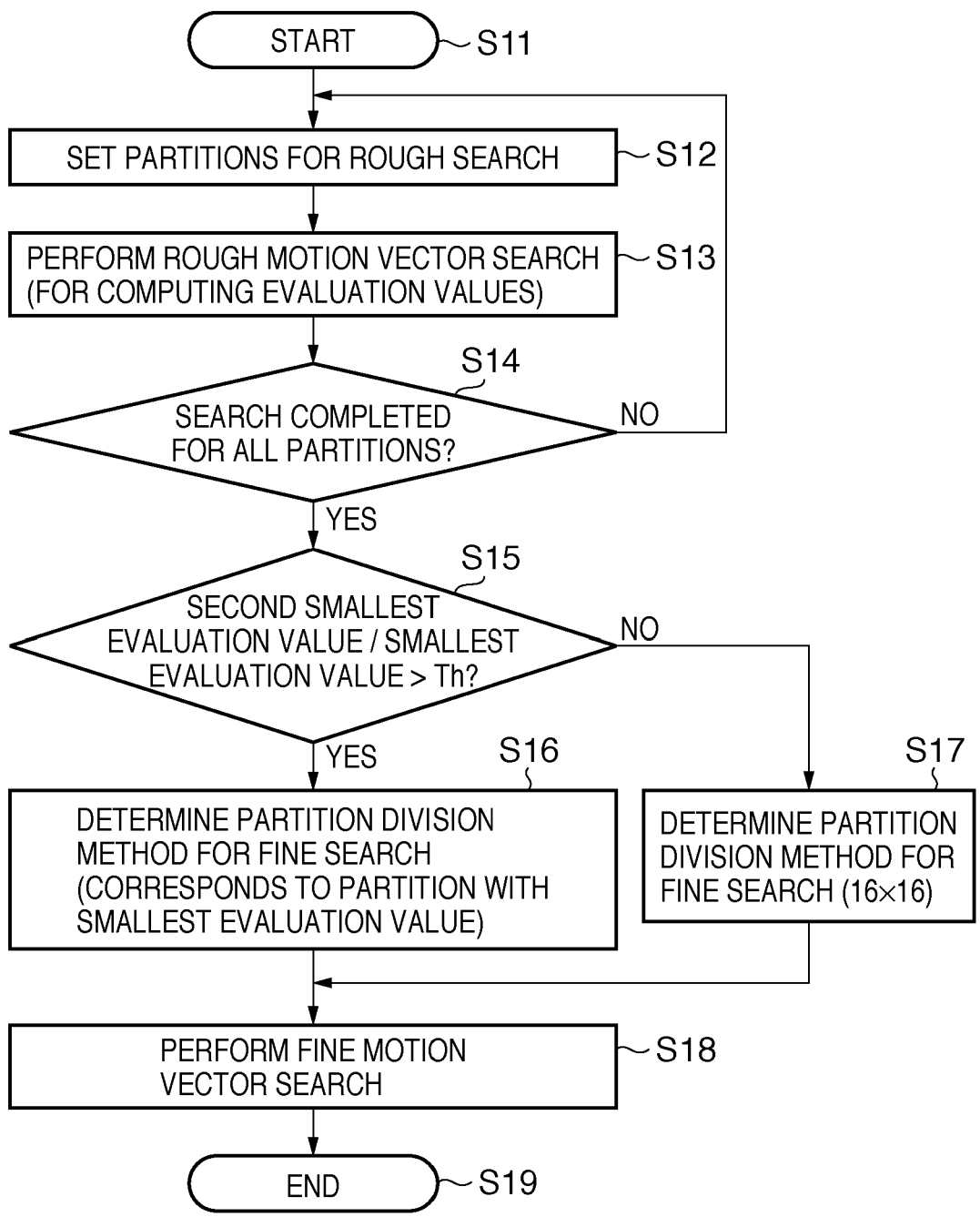
FIG. 3 is a flowchart illustrating operation of a motion vector search unit provided in a moving image encoding apparatus according to a first embodiment of the present invention.

FIG. 3 is a flowchart illustrating operation of the motion vector search unit 103 provided in the encoding unit 11 according to the first embodiment of the present invention.

Rough Search

When operation is started at step S11, the motion vector search unit 103, in step S12, performs a process of setting a plurality of partitions for use in a rough search. In this process, firstly, the image data of the encoding block targeted for encoding (hereinafter, encoding target block) is read out from the frame memory 102, and the image data (reference image data) of a motion vector search area is read out from the frame memory 102. The read image data of the encoding target block and the read image data of the search area then undergo a reduction process using a prescribed reduction rate. The reduction process is performed in the motion vector search unit 103 by performing pixel decimation according to the reduction rate, for example, on the image data read out from the frame memory 102. The reduction process is not limited to this, and may be performed using linear interpolation or the like.

The reduction process is also not limited to being performed by the motion vector search unit 103. For example, image data that has been reduced in advance by a prescribed reduction rate may be stored in the frame memory 102. In this case, the motion vector search unit 103 acquires the image data of the encoding target block that has undergone the reduction process and the image data of the motion vector search area that has undergone the reduction process by reading out the reduced image data. Further, the motion vector search unit 103 may read out the image data from the frame memory 102 while decimating pixels according to the reduction rate.

Figure 4A:
FIGS. 4A to 4D illustrate motion compensation block division according to the first embodiment of the present invention.
Figure 4B:
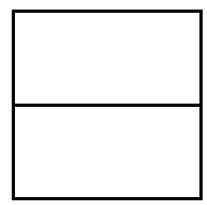
Figure 4C:
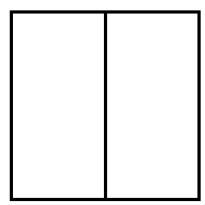
Figure 4D:
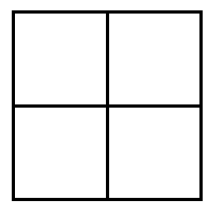

In the first embodiment, the reduction rate is 1/4 both horizontally and vertically, and the search area in the reduced image is ±8 pixels both horizontally and vertically. As an example, if the size of the encoding target block is 16×16 pixels, the reduced encoding target block will be 4×4 pixels in size. The encoding target block is divided into one or more motion compensation blocks (partitions) as shown in FIGS. 4A to 4D. That is, with the partition division method shown in FIG. 4A, the encoding target block is divided into a single partition composed of 16×16 pixels, and with the partition division method shown in FIG. 4B, the encoding target block is divided into two partitions composed of 16×8 pixels. With the partition division method shown in FIG. 4C, the encoding target block is divided into two partitions composed of 8×16 pixels, and with the partition division method shown in FIG. 4D, the encoding target block is divided into four partitions composed of 8×8 pixels. The motion vector search is performed for each partition. Note that the size of the partitions shown in FIGS. 4A to 4D is represented by the pixel count in the image prior to reduction, with the division method of FIG. 4A being referred to as partition type 16×16, and the division method of FIG. 4B being referred to as partition type 16×8. Similarly, the division method of FIG. 4C is referred to as partition type 8×16, and the division method of FIG. 4D being referred to as partition type 8×8. Consequently, in the case of partition type 16×16, the reduced image will be a partition of four horizontal pixels and four vertical pixels.

Next, the processing proceeds to step S13, where the motion vector search unit 103 performs a motion vector search (evaluation value computation) by performing a rough motion vector search for each of the set partitions using the reduced image data of the encoding target block and the search area. With the motion vector search, a plurality of evaluation values are computed based, for instance, on the correlation between the encoding target block and the block of a prediction image extracted from the image data of the search area (here, ±8 pixels both horizontally and vertically, as noted above) while changing the coordinates for extracting the prediction image. The coordinates when the evaluation value is the smallest are determined as the motion vector of the partition.

Here, a difference absolute value sum obtained by adding the absolute values of the differences for each of corresponding pixels in the prediction image and the encoding target block, and a value equivalent to the code amount of a motion vector computed from the coordinates for extracting the prediction image are respectively multiplied by a coefficient and added together to give a value that is used as an evaluation value.

Next, in step S14, the motion vector search unit 103 judges whether the search is completed for all of the plurality of set partitions. If it is judged not to be completed, the processing returns to step S12, and the foregoing processing is repeated. If it is judged in step S14 that the search is completed for all of the partitions, the processing proceeds to step S15.

Determination of Partition Division Method

Next, in step S15, the motion vector search unit 103 judges whether a value obtained by dividing the second smallest evaluation value by the smallest evaluation value, out of the evaluation values of the encoding target blocks for each partition computed at step S13, is greater than a predetermined threshold. If it is judged to be greater, the reliability of the evaluation values is judged to be high, and the processing proceeds to step S16. In step S16, the motion vector search unit 103 sets the partition with the smallest evaluation value, out of the partitions set at step S12. Note that in the case of judging the reliability of the evaluation values, the motion vector search unit 103 may be configured to judge the reliability as being high if the evaluation values are less than a given threshold.

Figure 5A:
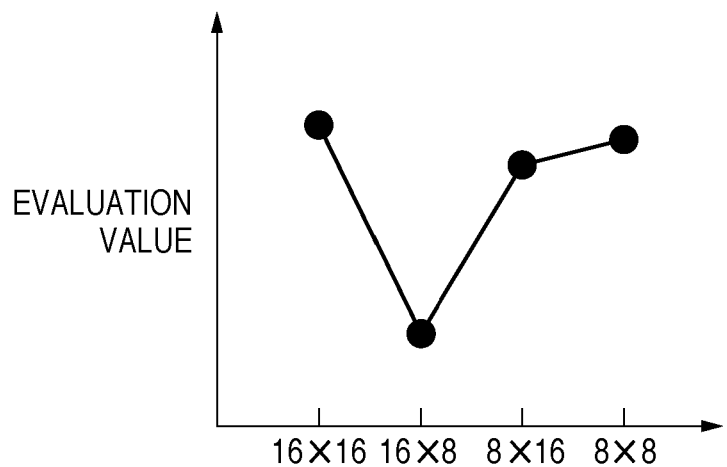
FIGS. 5A and 5B show exemplary evaluation values according to the first embodiment of the present invention.

FIG. 5A shows an exemplary correspondence relation between partition types and respective evaluation values in the case where the reliability of the foregoing evaluation values is judged to be high. In the case of FIG. 5A, the motion vector search unit 103, in step S16, sets the partition type 16×8 having the smallest of the evaluation values as the partition to be used in the subsequent fine motion vector search (described below).

On the other hand, if it is judged in step S15 that the foregoing divided value is less than or equal to the predetermined threshold, the reliability of the evaluation values is judged to be low, and the processing proceeds to step S17. In step S17, the motion vector search unit 103 sets a preset partition division method as the partition division method for use in the subsequent fine search.

Figure 5B:
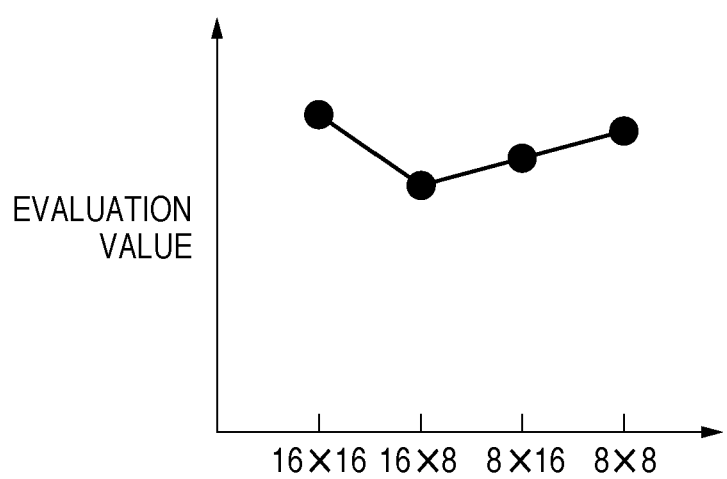

Since the preset partition division method is the partition division method according to which the motion compensation block size is largest, the partition type 16×16 is set. FIG. 5B shows an exemplary correspondence relation between partition types and respective evaluation values in the case where the reliability of the evaluation values is judged to be low. Note that the preset partition division method may be a partition division method according to which a probability of occurrence is statistically high.

Fine Search

When the processing of step S16 or step S17 is completed, the processing then proceeds to step S18. In step S18, the motion vector search unit 103 determines a motion vector using partitions formed using the partition division method determined at step S16 or S17. This involves performing a motion vector search and determining a motion vector, by computing evaluation values similarly to the rough search, using an area of ±3 pixels both horizontally and vertically in an image that has not undergone the reduction process, centered on the coordinates indicated by the motion vector of the same partition derived in the foregoing rough search.

According to the moving image encoding method of the first embodiment, as discussed above, the amount of processing required for a motion vector search is reduced, since only one partition division method is used in the fine search. This enables real-time encoding to be performed even when using a processor that is not overly fast, and further enables power consumption to be reduced when performing real-time encoding.

Second Embodiment

Next, processing in the motion vector search unit 103 according to a second embodiment of the present invention will be described in detail. A partition division method is also derived in the second embodiment using a two-stage process involving a rough search for performing a motion vector search with a low search accuracy and a fine search for performing the search after increasing the search accuracy. A motion vector corresponding to an obtained partition is then determined as a final motion vector search result.

Figure 6:
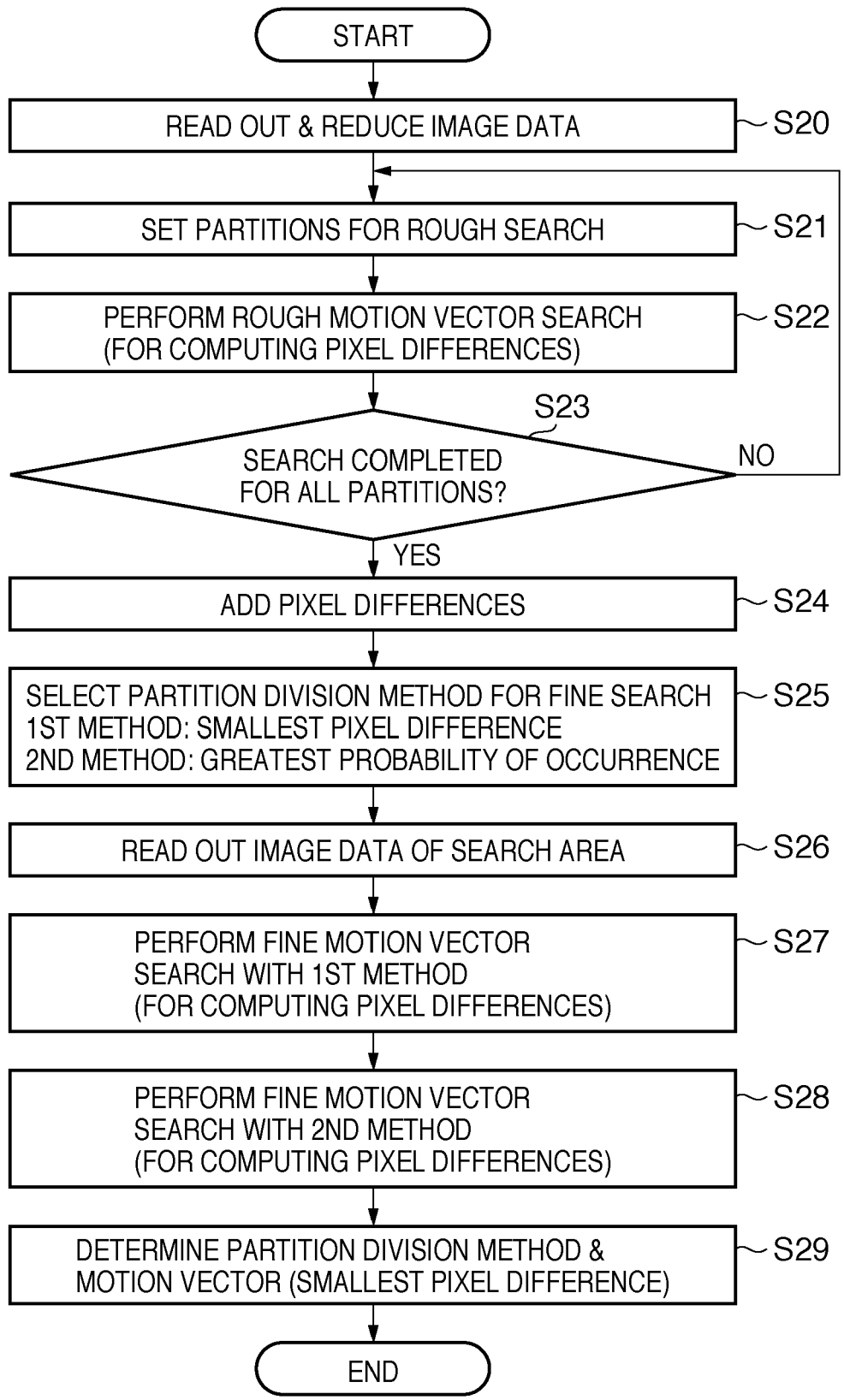
FIG. 6 is a flowchart showing an exemplary motion vector search process according to a second embodiment of the present invention.

FIG. 6 is a flowchart showing an exemplary motion vector search process according to the second embodiment.

Rough Search

Firstly, at step S20, the image data of a block targeted for encoding is read out from the frame memory 102 and supplied to the motion vector search unit 103, and the image data (reference image data) of a motion vector search area is read out from the frame memory 102.

The motion vector search unit 103 then respectively reduces the image data of the encoding target block and the image data of the motion vector search area read out and supplied from the frame memory 102 by a prescribed reduction rate, as described in the first embodiment.

Hereinafter, it will be assumed in the second embodiment that the reduction rate of image data in the rough search is 1/4 in both the horizontal and vertical directions, and that the search area is an area of ±8 pixels in both the horizontal and vertical directions in the reduced image data with respect to the encoding target block.

Once the process of reducing the image data of the encoding target block and the search area at step S20 is completed, the processing moves to step S21. At step S21, the motion vector search unit 103 sets partitions with respect to the reduced encoding target block. In the second embodiment, the motion vector search unit 103 sequentially sets the four types of partitions illustrated in FIGS. 4A to 4D as described above with respect to the encoding target block, in the loop of step S23 (described below).

Once partitions have been set in step S21 with respect to the encoding target block, the processing moves to step S22. In step S22, the motion vector search unit 103 performs a rough motion vector search for each of the set partitions using the reduced image data of the encoding target block and the search area. That is, in step S22, the block with the highest correlation is selected by block matching with the image data of the search area, for each partition of the encoding target block.

The motion vector search unit 103 then stores the difference between the coordinates of the selected block with the highest correlation and the coordinates of the respective partition of the encoding target block as the motion vector of that partition. Here, the coordinates of a representative point within the block and the partition, such as the coordinates of the upper left corner, for example, are used as the coordinates of the block and the partition. The motion vector search unit 103 stores as a pixel difference of that partition a value obtained by adding together the difference values of corresponding pixels in the block with the highest correlation and the respective partition of the encoding target block.

Once the rough search process of step S22 is completed, the processing moves to step S23, where it is judged whether the rough search is completed for all of the partitions set at step S21. If it is judged that the rough search is not completed for all partitions, the processing returns to step S21, and the rough search is performed on the next partition. For example, the partition types 16×16, 16×8, 8×16 and 8×8 shown in FIGS. 4A to 4D are sequentially set, and processing is sequentially performed on each partition of these partition types 16×16, 16×8, 8×16 and 8×8.

If it is judged at step S23 that the rough search is completed for all partitions, the processing moves to step S24. In step S24, the pixel differences stored for the partitions in step S22 are added together in units of encoding target blocks. In other words, in step S24, the pixel differences derived for each partition are consolidated as a pixel difference in units of encoding target blocks for each partition division method. For example, in the case of the partition type 16×8, the pixel difference of the upper partition and the pixel difference of the lower partition are added together. This is performed for each of the partition types 16×16, 16×8, 8×16 and 8×8.

Next, at step S25, the motion vector search unit 103 determines candidate partition division methods for use in a fine search. Firstly, the pixel differences derived at step S24 in units of encoding target blocks for each of the partition types divided using the partition division methods are compared, and the partition division method corresponding to the partition type yielding the smallest pixel difference is selected and determined as a first partition division method. Secondly, the partition division method yielding the greatest probability of occurrence derived probabilistically by a statistical process is determined as a second partition division method.

Note that the second partition division method is obtained, for example, by selecting the partition division method that yields the greatest probability of having the smallest pixel difference in units of encoding target blocks when the technique for deriving the first partition division method has been applied to a large number of moving images. For example, the results of deriving the first partition division method with respect to a large number of moving images are accumulated, and the accumulated data is statistically analyzed. In this case, the second partition division method is assumed to be fixed. In the case where the partition types are 16×16, 16×8, 8×16 and 8×8, it is assumed that, generally, the partition type 16×16 has a high probability of being the second partition division method. The reason for the probability of 16×16 generally being high will be supplementarily described. Encoding natural images is premised on there normally being a tendency for the amount of operations required in the encoding process and the amount of code that arises to increase as partition size decreases, despite the expected improvement in image quality. In view of this, an apparatus that encodes moving images in real-time, in particular, will attempt to prioritize larger partition sizes where the effect is about the same, given the object of efficiently executing the encoding process.

Fine Search

Once candidate partition division methods for use in a fine search have been determined, the processing moves to step S26, where the image data of the encoding target block and the image data of the search area are again read out from the frame memory 102 by the motion vector search unit 103. In the fine search, the search process is performed without reducing the image data of the encoding target block and the image data of the search area.

At the next step S27, a motion vector search is performed for each partition set by the first partition division method. More specifically, an area of ±3 pixels both horizontally and vertically with respect to the partition, centered on the coordinates indicated by the motion vector of the same partition derived in the above rough search, is determined as the search area. Block matching with the partition is performed in this search area, and a motion vector is derived by selecting the block with the highest correlation. Further, a value obtained by adding together the difference values of corresponding pixels in the block with the highest correlation derived as a result of the block matching and the respective partition in the encoding target block is stored as the pixel difference of that partition.

At the next step S28, a motion vector search is performed similarly to the above step S27, for each partition set using the second partition division method. Once the motion vector search process based on the second partition division method at step S28 is completed, the processing moves to step S29.

At step S29, the motion vector search unit 103 determines the partition division method, and the motion vector of the encoding target block. Similarly to the above step S24, the pixel differences stored for the partitions are added together in units of encoding target blocks, for each of the first and second partition division methods. The pixel difference total in units of encoding target blocks for the first partition division method is compared with the pixel difference total in units of encoding target blocks for the second partition division method. As a result of the comparison, the smaller pixel difference total, out of the first and second partition division methods, is selected and determined as the partition division method for the encoding target block.

A motion vector corresponding to the selected partition division method, out of the motion vectors stored at the above steps S27 and S28, is determined as a motion vector of the encoding target block.

The above operation of the motion vector search unit 103 will be described in greater detail using FIG. 7. Here, the partition type set by the first partition division method yielding the smallest pixel difference in the rough search is assumed to be the partition type 8×16, and the partition type set by the second partition division method yielding the greatest probability of occurrence is assumed to be the partition type 16×16.

The rough search is performed for each of the partition types 16×16, 16×8, 8×16 and 8×8 as a result of the processing of steps S21 to S23 in FIG. 6 (see upper level of FIG. 7), and a pixel difference and a motion vector resulting from the rough search are derived for each partition. Pixel differences are derived in units of encoding target blocks at step S24. Based on the results thereof, a first partition division method yielding the smallest pixel difference (partition type 8×16 in the given example) and a second partition division method yielding the greatest probability of occurrence (partition type 16×16 in the given example) are determined at step S25.

Figure 7:
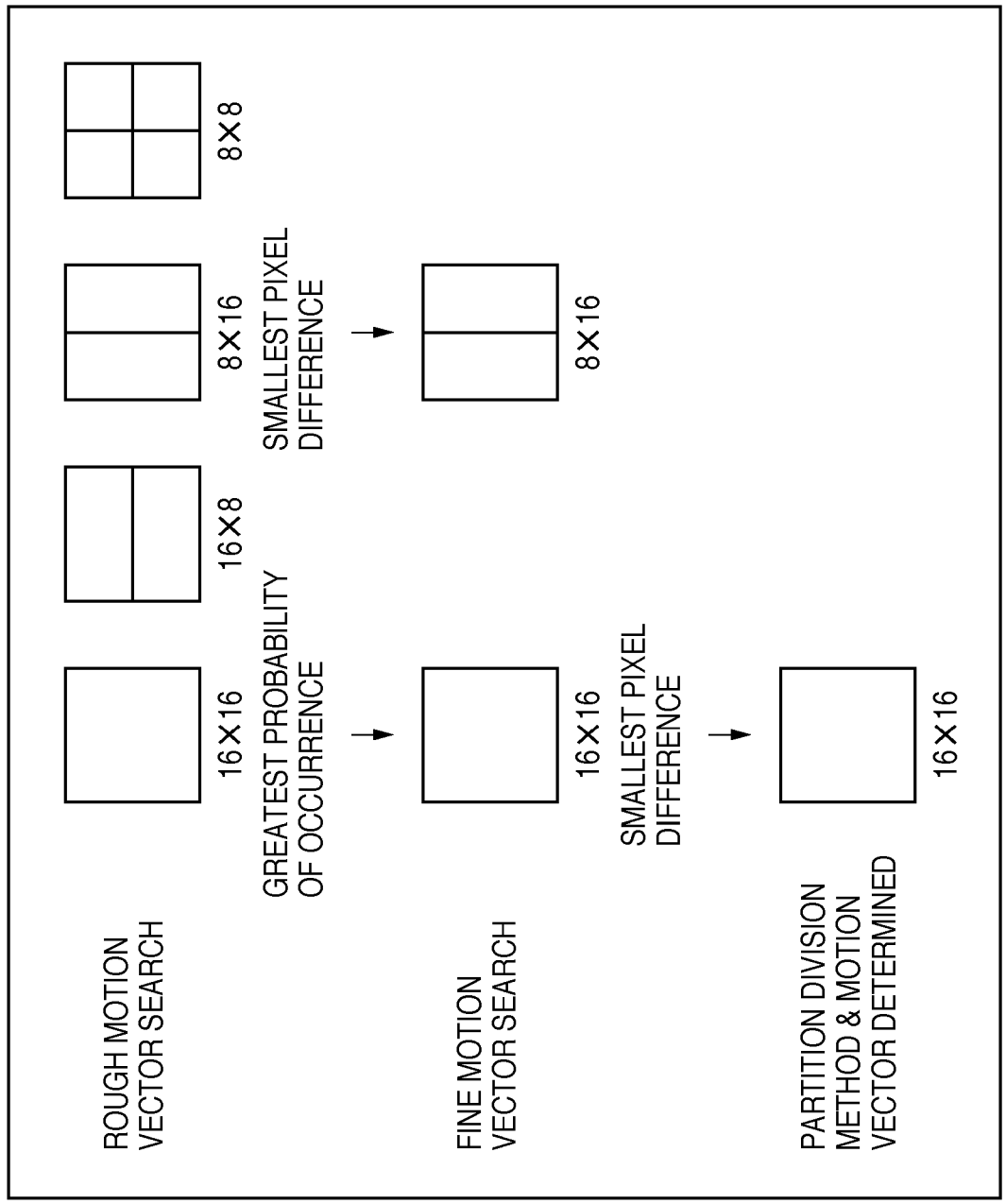
FIG. 7 illustrates, in greater detail, operation of a motion vector search unit according to the second embodiment of the present invention.

In the fine search, the process of deriving a motion vector and the process of deriving a pixel difference are respectively performed for the first and second partition division methods, as illustrated in the middle level of FIG. 7 (steps S27 and S28).

The smaller pixel difference total of the encoding target block, out of the first and second partition division methods is selected as the partition division method for the encoding target block. Also, a motion vector corresponding to the selected partition division method is determined as a motion vector of the encoding target block. In the example shown in the lower level of FIG. 7, partition type 16×16 has been selected as the final partition division method.

According to the second embodiment of the present invention, only two partition division methods for performing a motion vector search are used during the fine search. Thus, the amount of operations required for a motion vector search is reduced.

Third Embodiment

Next, a third embodiment of the present invention will be described. The third embodiment of the present invention is a generalization of the motion vector search operation of the above second embodiment. That is, in the above second embodiment, the motion vector search is performed over two stages involving a rough search and a fine search. In contrast, in the third embodiment, the motion vector search is performed over n stages, while raising the search accuracy stepwise and narrowing the number of partition division methods. Consequently, the motion vector search operation of the above second embodiment can be seen as a limited example of the motion vector search operation of the third embodiment.

Hereinafter, exemplary processing of the motion vector search unit 103 in the third embodiment will be described using the flowchart of FIG. 8.

At step S30, the accuracy of the motion vector search by the motion vector search unit 103 is set. The motion vector search unit 103 then reduces the image data of the encoding target block and the image data of the search area read out from the frame memory 102 according to the search accuracy, similarly to the above second embodiment. For example, the reduction ratrateio of the image data will be 1/4 if the search accuracy is four pixel units, the reduction rate will be 1/2 if the search accuracy is two pixel units, and the reduction rate will be 1/1 (no reduction) if the search accuracy is one pixel unit.

At the next step S31, partitions are set, and group setting is performed with respect to the partition division methods. In the third embodiment, the partition division methods are apportioned to groups, and the motion vector search process is performed for each group. As will be detailed below, grouping can be performed based on a probability of occurrence yielded by the partition types.

At steps S32 and S33, the motion vector search process is performed, with respect to the partition group targeted for searching, according to the search accuracy, similarly to the processing of step S22 in the above second embodiment, for each of the set partitions. That is, block matching with the reference image data is performed for each partition of the encoding target block, and the block with the highest correlation is selected. The difference in coordinates between the block and the respective partition is stored as the motion vector of that partition, and a value obtained by adding together the difference values of corresponding pixels is stored as the pixel difference of the partition.

If it is judged at step S33 that the search process is completed for one partition group, the processing moves to step S34. At step S34, candidate partition division methods for the motion vector search process according to the next search accuracy are determined. That is, at step S34, the pixel differences in units of encoding target blocks for each partition division method within the partition group that has been processed are compared, and a first partition division method yielding the smallest pixel difference is selected, similarly to the above step S25. Also, the motion vector search unit 103 selects a second partition division method yielding the greatest probability of occurrence derived by a statistical technique.

The processing moves to step S35, where it is judged whether the motion vector search process according to the search accuracy set at step S30 is completed for all partition groups. If it is judged to not be completed, the processing returns to step S31, where processing is performed on the next partition group.

If it is judged at step S35 that the motion vector search process at the search accuracy is completed for all partition groups, the processing moves to step S36. At step S36, it is judged whether the number of partition groups is one and the number of candidate partition division methods is two. If it is judged in step S36 that the number of partition groups is not one or the number of candidate partition division methods is not two, the processing returns to step S30, where motion vector search accuracy setting is performed. The processing of steps S30 to S36 is sequentially repeated until the conditions of step S36 are satisfied.

On the other hand, if it is judged in step S36 that the number of partition groups is one and the number of candidate partition division methods is two, the processing proceeds to step S37. At step S37, the pixel differences of the partitions are added together in units of encoding target blocks, for each of the two partition division methods. The respective pixel difference totals for the two partition division methods are then compared, and the partition division method yielding the smaller pixel difference total is selected and determined as the partition division method of the encoding target block. Similarly in relation to the motion vectors, a motion vector corresponding to the selected partition division method is determined as a motion vector of the encoding target block.

Figure 9:
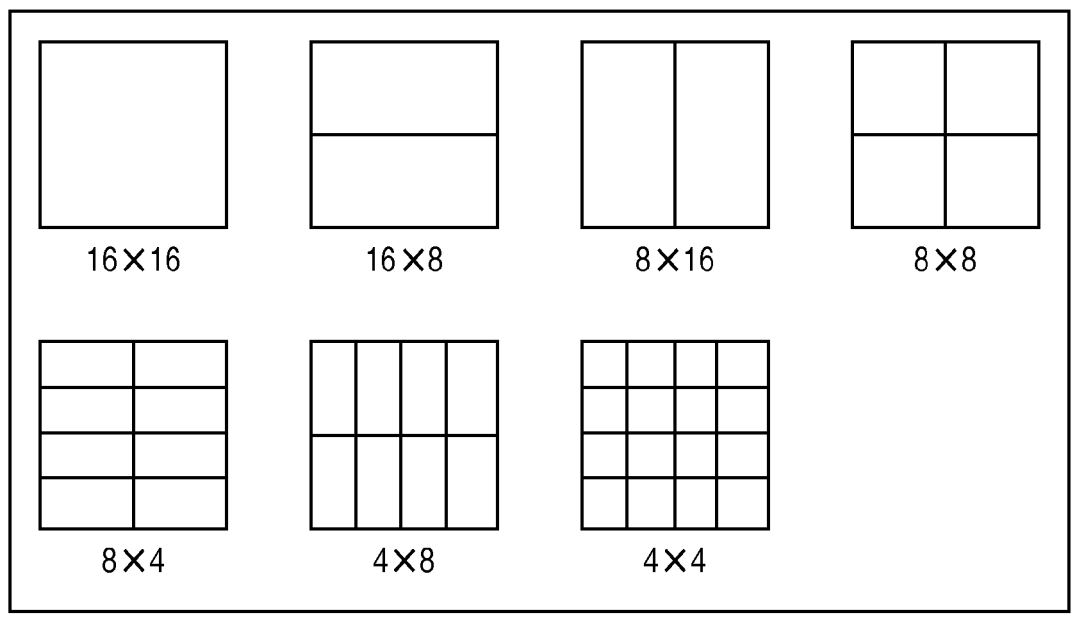
FIG. 9 shows exemplary partitions set with respect to an encoding target block according to the third embodiment of the present invention.
Figure 10:
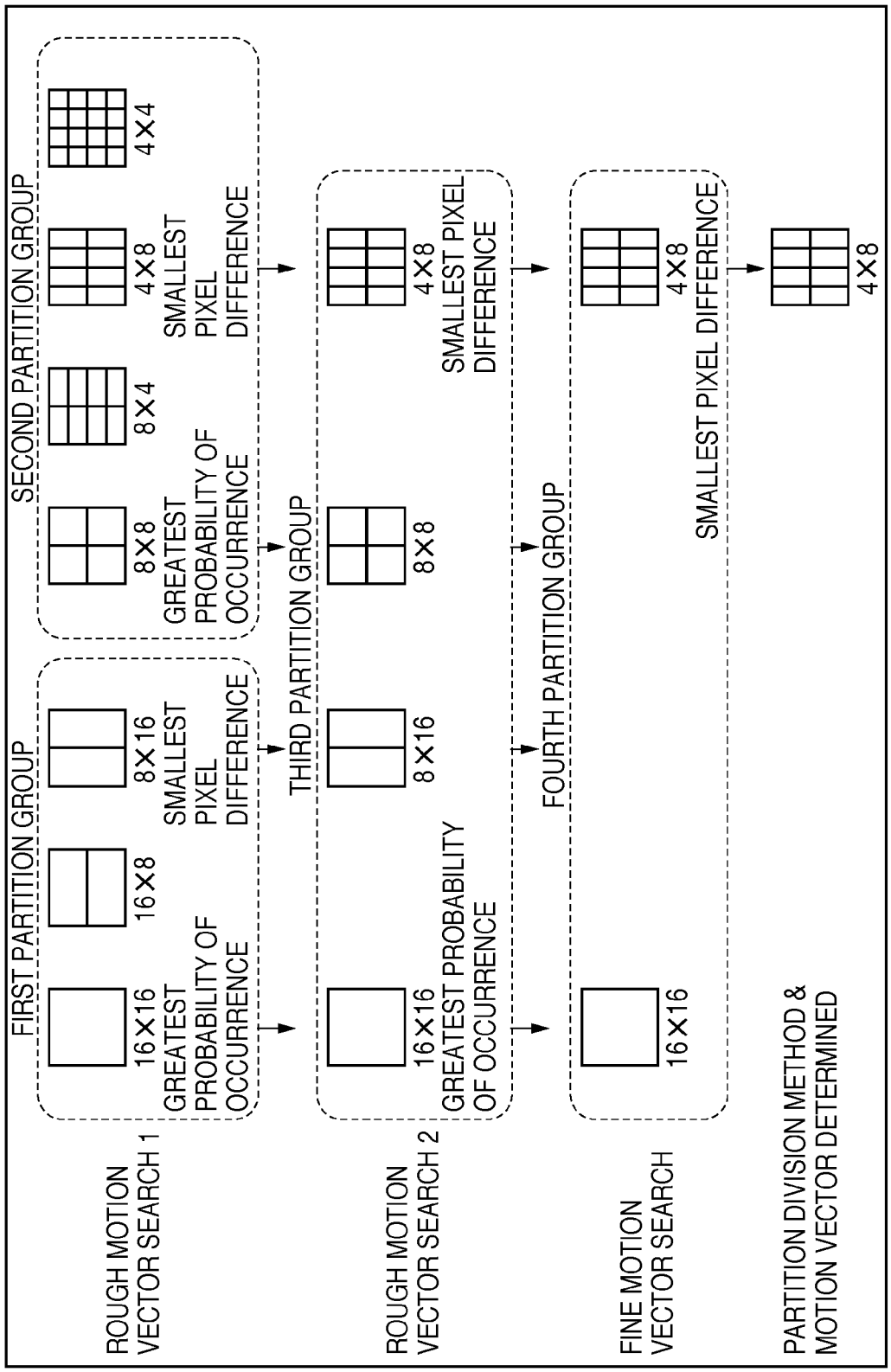
FIG. 10 illustrates, in greater detail, operation of a motion vector search unit according to the third embodiment of the present invention.

The processing of the FIG. 8 flowchart will be described in greater detail using FIGS. 9 and 10. Here, the motion vector search operation is performed in three stages, raising the search accuracy from units of four pixels to two pixels to one pixel in order. The seven partition types illustrated in FIG. 9 are provided as the partition division methods. That is, the partition types 8×4, 4×8 and 4×4 are provided in addition to the partition types 16×16, 16×8, 8×16 and 8×8 used in the above embodiments. The partition type 8×4 bisects the partitions of the partition type 8×8 in the horizontal direction. The partition type 4×8 bisects the partitions of the partition type 8×8 in the vertical direction. The partition type 4×4 bisects the partitions of the partition type 8×8 horizontally and vertically.

In the processing of the first stage, the accuracy of the motion vector search is set to four pixel units at step S30, and the image data of the encoding target block and the motion vector search area is reduced at a reduction rate of 1/4. At step S31, partition setting and group setting with respect to the partition division methods is then performed. For example, the partition types 16×16, 16×8, 8×16 are set as a first partition group, and the partition types 8×8, 8×4, 4×8 and 4×4 are set as a second partition group, as illustrated by "Rough Motion Vector Search 1" in FIG. 10.

Here, the group setting with respect to the partition division methods can, for example, be performed based on a probability of occurrence yielded by the partition division methods. That is, in the case where seven types of partition division methods are provided as shown in FIG. 9, probability of occurrence peaks are known to occur in partition types 16×16 and 8×8. The partition division methods in which these probability of occurrence peaks occur are apportioned to different groups. The opportunity to compare partition division methods selected based on probability of occurrence with partition division methods selected based on pixel difference thus increases, enabling the partition division method selection and the motion vector search to be performed with greater accuracy.

At steps S32 and S33, the motion vector search is performed for each partition group. Firstly, the motion vector search process is performed on the first partition group, and once completed, the processing moves to step S34. The pixel differences in units of encoding target blocks for each of the partition division methods in the first partition group are compared, and a first partition division method yielding the smallest pixel difference and a second partition division method yielding the greatest probability of occurrence are selected. In the "Rough Motion Vector Search 1" example of FIG. 10, the partition type 8×16 is selected as the first partition division method, and the partition type 16×16 is selected as the second partition division method.

The motion vector search process is similarly performed on the second partition group, and at step S34, a third partition division method yielding the smallest pixel difference and a fourth partition division method yielding the greatest probability of occurrence are selected. In the "Rough Motion Vector Search 1" example of FIG. 10, the partition type 4×8 is selected as the third partition division method, and the partition type 8×8 is selected as the fourth partition division method.

Because the motion vector search process with respect to all of the partition groups in the first stage is completed (step S35), the processing moves to step S36. At this stage, the number of partition groups is two and the number of partition division method candidates is four, as illustrated by "Rough Motion Vector Search 1" in FIG. 10, so the processing returns to step S30. The search accuracy is then set to two pixel units, and the processing of the second stage is started.

In the processing of the second stage, partition group setting is performed at step S31. In the processing of the first stage, the first to fourth partition division methods are selected as partition division method candidates. At step S31, a new partition group (third partition group) is created from the first to fourth partition division methods, as illustrated by "Rough Motion Vector Search 2" in FIG. 10.

In steps S32 and S33, the motion vector search process is then performed similarly to the above for this third partition group, and once completed, the processing moves to step S34. A fifth partition division method yielding the smallest pixel difference and a sixth partition division method yielding the greatest probability of occurrence are then selected. In the "Rough Motion Vector Search 2" example of FIG. 10, the partition division method corresponding to the partition type 4×8 is selected as the fifth partition division method, and the partition division method corresponding to the partition type 16×16 is selected as the sixth partition division method.

Because the motion vector search process with respect to all of the partition groups in the second stage is completed (step S35), the processing moves to step S36. At this stage, the number of partition groups is one and the number of partition division method candidates is four, as illustrated in the "Rough Motion Vector Search 2" of FIG. 10, so the processing returns to step S30. The search accuracy is then set to one pixel unit, and the processing of the third stage is started.

In the processing of the third stage, partition group setting is performed at step S31. In the processing of the second stage, the fifth and sixth partition division methods were selected as partition division method candidates. At step S31, a new partition group (fourth partition group) is created from the fifth and sixth partition division methods, as illustrated by "Fine Motion Vector Search" in FIG. 10.

In steps S32 and S33, the motion vector search process is then performed similarly to the above for this fourth partition group, and once completed, the processing moves to step S34. The partition division method yielding the smallest pixel difference and the partition division method yielding the greatest probability of occurrence are then selected. In the "Fine Motion Vector Search" example of FIG. 10, the partition type 4×8 is selected as the partition type yielding the smallest pixel difference, and the partition type 16×16 is selected as the partition type yielding the greatest probability of occurrence.

Because the motion vector search process with respect to all of the partition groups in the third stage is completed (step S35), the processing moves to step S36. At this stage, the number of partition groups is one and the number of partition division method candidates is two, as illustrated by "Fine Motion Vector Search" in FIG. 10, so the processing moves to step S37.

At step S37, the pixel differences of the partitions are added together in units of encoding target blocks for each of the two partition division methods, and the smaller pixel difference total is selected and determined as the partition division method of the encoding target block. Similarly in relation to the motion vectors, a motion vector corresponding to the selected partition division method is determined as a motion vector of the encoding target block. In the "Motion Vector/Partition Determined" example of FIG. 10, the partition type 4×8 is selected as the final partition division method.

According to the third embodiment, the number of partition division methods used for searching is reduced, even in the case where the motion vector search process is performed over n-stages according to the search accuracy, enabling the amount of operations required in the motion vector search to be suppressed.

Note that although described above as being applied to a digital video camera, the present invention is not limited to this example. That is, the present invention can also be applied to other types of apparatuses, provided the apparatus performs encoding of moving image data in compliance with H.264|AVC.

Other Embodiments According to the Present Invention

The means constituting a moving image encoding apparatus in the foregoing embodiments of the present invention can be realized by the operation of a program stored on a RAM, ROM or the like of a computer. This program and a computer-readable recording medium on which the program is recorded are encompassed by the present invention.

The present invention can, for example, also take an embodiment as a system, an apparatus, a method, a program, a recording medium or the like, and may specifically be applied to a system constituted by a plurality of devices or an apparatus composed of a single device.

Figure 8:
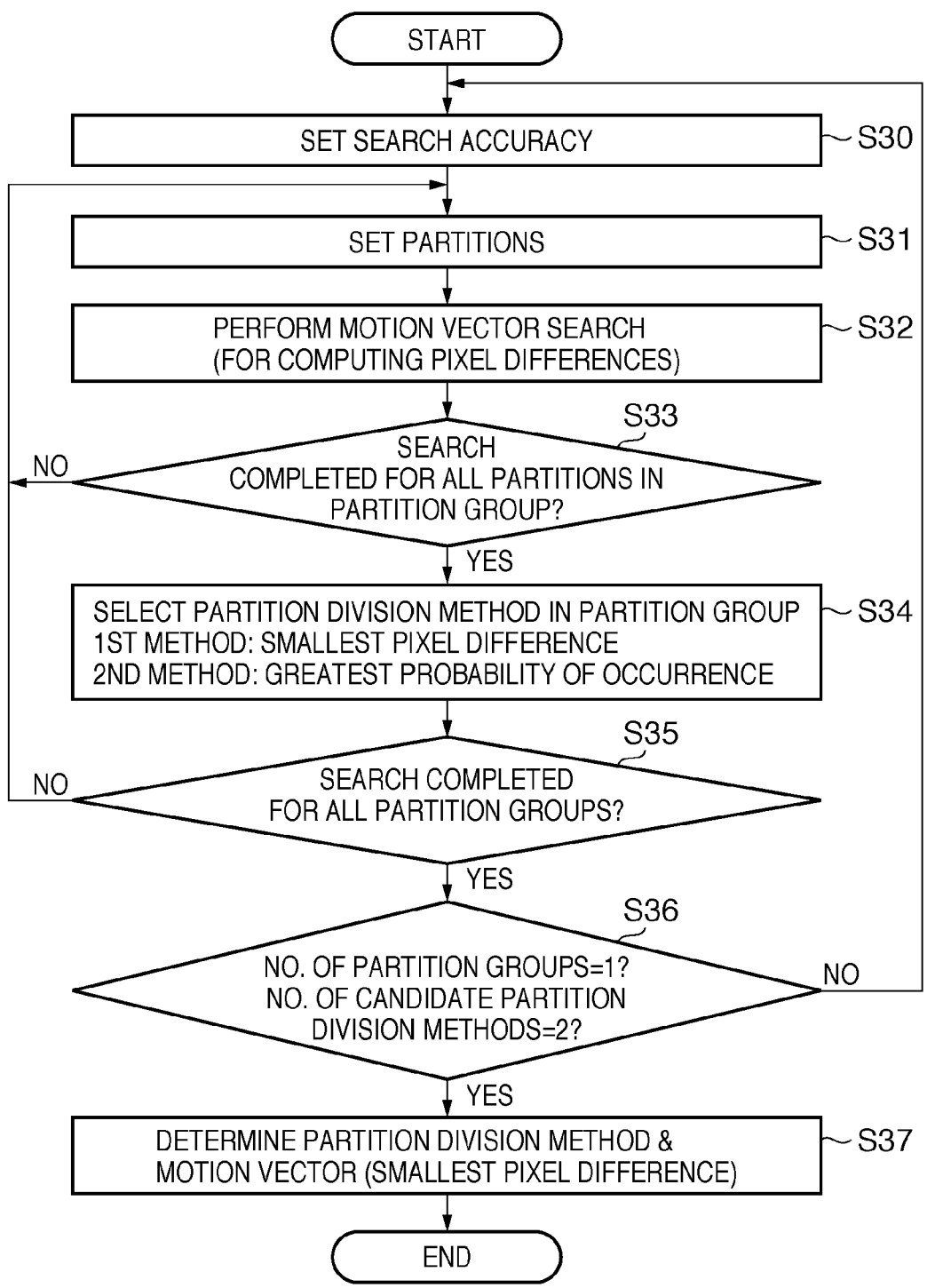
FIG. 8 is a flowchart showing an exemplary motion vector search process according to a third embodiment of the present invention.

Note that present invention may be achieved by a software program (in the embodiments, a program corresponding to the flowchart show in FIG. 3, 6 or 8) for executing the steps of the foregoing moving image encoding method being directly or remotely supplied to a system or an apparatus, and a computer in the system or apparatus reading out and executing the supplied program code.

Consequently, the present invention is also realized by the actual program code installed on a computer, in order to realize the functions and processes of the present invention by computer. In other words, the present invention also encompasses the actual computer program for realizing the functions and processes of the present invention.

In this case, any mode of program is acceptable, such as object code, a program executed by an interpreter or script data supplied to an operating system, as long as the functions of the program are provided.

A variety of recording media can be used as a recording medium for supplying the program. For example, these include Floppy® disk, hard disk, optical disk, magneto-optical disk, MO, CD-ROM, CD-R, CD-RW, magnetic tape, non-volatile memory card, ROM, and DVD (DVD-ROM, DVD-R).

Alternatively, the program can also be supplied by connecting to a website on the Internet using the browser of a client computer, and downloading the actual computer program of the present invention or a compressed file including an auto-install function from the website to a recording medium such as a hard disk.

Also, supply can be realized by dividing program code constituting the program of the present invention into a plurality of files and downloading the respective files from different websites. In other words, a World Wide Web (WWW) server that allows a plurality of users to download program files for realizing the functions and processes of the present invention by computer is also encompassed by the present invention.

Supply can also be realized by distributing the program of the present invention to users in encrypted form stored on a storage medium such as a CD-ROM, and allowing users that meet a prescribed requirement to download decryption key information from a website via the Internet, and to execute the encrypted program by using this key information and install the program on a computer.

Apart from the functions of the foregoing embodiments being realized as a result of a computer executing the read program, the functions of the foregoing embodiments can be realized by an operating system or the like running on a computer performing part or all of the actual processing.

Further, the program read out from the recording medium may also be written to a memory provided in a function expansion board inserted in a computer or a function expansion unit connected to a computer, and a CPU or the like provided in the function expansion board or the function expansion unit may then performs part or all of the actual processing based on instructions in the program, with the functions of the foregoing embodiments being realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-095436, filed on Apr. 1, 2008, and 2008-148324, filed on Jun. 5, 2008, which are hereby incorporated by reference herein in their entirety.

The invention claimed is:

1. A moving image encoding apparatus comprising:
   a motion vector search unit that divides a screen into encoding blocks, each constituting a unit of coding, divides the encoding block into one or more motion compensation blocks, each constituting a unit of motion compensation, and performs a motion vector search by referencing, as a reference image, a past or future image with respect to a motion compensation block targeted for encoding; and
   an encoding unit that encodes a difference value between the motion compensation block targeted for encoding and a prediction image that is based on a motion vector obtained by the motion vector search unit,
   wherein the motion vector search unit includes:
   a setting unit that sets a plurality of motion compensation block types with respect to the encoding block, when roughly performing a motion vector search using a reduced image of the reference image;
   an evaluation value computation unit that performs the motion vector search using the reduced image, for each of the plurality of motion compensation block types set by the setting unit, and computes an evaluation value for each of the plurality of motion compensation block types, based on the plurality of obtained motion vectors; and
   a determination unit that determines, according to a reliability of a most highly evaluated evaluation value out of the plurality of evaluation values computed by the evaluation value computation unit, whether to set a division method of the motion compensation block type for which the most highly evaluated evaluation value was obtained as a motion compensation block division method for when performing a motion vector search in detail using the reference image.

2. The moving image encoding apparatus according to claim 1, wherein the determination unit performs the motion vector search with a higher accuracy using the motion compensation block division method for which the most highly evaluated evaluation was obtained among the evaluation values, if the reliability of the most highly evaluated evaluation value is high, and performs the motion vector search with a higher accuracy using a preset motion compensation block division method, if the reliability of the most highly evaluated evaluation value is low.

3. The moving image encoding apparatus according to claim 2, wherein the preset motion compensation block division method is a motion compensation block division method yielding a largest motion compensation block size.

4. The moving image encoding apparatus according to claim 2, wherein the preset motion compensation block division method is a motion compensation block division method yielding a statistically high probability of occurrence.

5. The moving image encoding apparatus according to claims 1, wherein when judging the reliability of the evaluation value, the reliability is judged to be high if the evaluation value is less than a given threshold.

6. The moving image encoding apparatus according to claims 1, wherein when judging the reliability of the evaluation value, the reliability is judged to be high if a value obtained by dividing a second most highly evaluated evaluation value by the most highly evaluated evaluation value is greater than a given threshold.

7. A moving image encoding method comprising:
   a motion vector search step of dividing a screen into encoding blocks, each constituting a unit of coding, dividing the encoding block into one or more motion compensation blocks, each constituting a unit of motion compensation, and performing a motion vector search by referencing, as a reference image, a past or future image with respect to a motion compensation block targeted for encoding, and encoding a difference value between the motion compensation block targeted for encoding and a prediction image that is based on the motion vector obtained in the motion vector search,
   wherein the motion vector search step includes:
   a setting step of setting a plurality of motion compensation block types with respect to the encoding block, when roughly performing a motion vector search using a reduced image of the reference image;

an evaluation value computing step of performing the motion vector search using the reduced image, for each of the plurality of motion compensation block types set in the setting step, and computing an evaluation value for each of the plurality of motion compensation block types, based on the plurality of obtained motion vectors; and a determination step of determining, according to a reliability of a most highly evaluated evaluation value out of the plurality of evaluation values computed in the evaluation value computation step, whether to set a division method of the motion compensation block type for which the most highly evaluated evaluation value was obtained as a motion compensation block division method for when performing a motion vector search in detail using the reference image.

8. A moving image encoding apparatus for dividing a screen into encoding blocks, each constituting a unit of coding, dividing the encoding block into one or more motion compensation blocks, each constituting a unit of motion compensation, and performing a motion vector search with reference to at least a past image with respect to the motion compensation blocks included in an encoding block targeted for encoding, comprising:

a dividing unit that divides the encoding block targeted for encoding using a set plurality of different division methods, and forms motion compensation blocks that correspond to the division methods;

a motion vector search unit that performs a motion vector search according to a search accuracy, with respect to each of the motion compensation blocks formed by the dividing unit using the plurality of different division methods;

a setting unit that selects at least one of the division methods based on a result of the motion vector search performed by the motion vector search unit, sets the selected division method and at least one prescribed division method out of the plurality of different division methods to the dividing unit, and sets the search accuracy to a higher search accuracy; and a control unit that performs control so as to sequentially repeat an operation of setting the division methods and the search accuracy by the setting unit, and an operation of performing the motion vector search by the motion vector search unit according to the set division methods and search accuracy, wherein the controlling unit, if judging that the search accuracy set by the setting unit as a result of the repeated operations is a preset search accuracy, selects a final division method out of the selected division method and the prescribed division method, based on a result of the motion vector search performed by the motion vector search unit, and determines a motion vector obtained as a result of the motion vector search performed using the final division method as a final motion vector.

9. The moving image encoding apparatus according to claim 8, wherein the setting unit selects one of the division methods based on a result of the motion vector search, sets the selected division method, and one prescribed division method out of the plurality of different division methods to the dividing unit.

10. The moving image encoding apparatus according to claim 8, wherein the setting unit allocates each of the plurality of motion compensation blocks formed using the plurality of different division methods to a group according to the division methods, and, for each group, selects at least one of the division methods based on a result of the motion vector search, and sets the selected division method, and at least one prescribed division method out of the plurality of different division methods to the dividing unit.

11. The moving image encoding apparatus according to claim 10, wherein the setting unit, for each group, selects one of the division methods based on a result of the motion vector search, sets the selected division method, and one prescribed division method out of the plurality of different division methods to the dividing unit.

12. The moving image encoding apparatus according to claims 8, wherein the prescribed division method is determined based on a result obtained by accumulating, for a plurality of image data, results of the motion vector search performed with respect to each of the motion compensation blocks formed by dividing the encoding block targeted for encoding using the plurality of different division methods, and performing a statistical process on the accumulated search results.

13. A moving image encoding method for dividing a screen into encoding blocks, each constituting a unit of coding, dividing the encoding block into one or more motion compensation blocks, each constituting a unit of motion compensation, and performing a motion vector search with reference to at least a past image with respect to the motion compensation blocks included in an encoding block targeted for encoding, comprising:

a dividing step of dividing the encoding block targeted for encoding using a set plurality of different division methods, and forming motion compensation blocks that correspond to the division methods;

a motion vector search step of performing a motion vector search according to a search accuracy, with respect to each of the motion compensation blocks formed in the dividing step using the plurality of different division methods;

a setting step of selecting at least one of the division methods based on a result of the motion vector search performed in the motion vector search step, setting the selected division method and at least one prescribed division method out of the plurality of different division methods for the dividing step, and setting the search accuracy to a higher search accuracy; and a control step of performing control so as to sequentially repeat an operation of setting the division methods and the search accuracy in the setting step, and an operation of performing the motion vector search in the motion vector search step according to the set division methods and search accuracy, wherein in the control step, if judging that the search accuracy set in the setting step as a result of the repeated operations is a preset search accuracy, a final division method out of the selected division method and the prescribed division method is selected based on a result of the motion vector search performed in the motion vector search step, and a motion vector obtained as a result of the motion vector search performed using the final division method is determined as a final motion vector.

14. A non-transitory computer-readable storage medium storing a program for causing a computer to execute the steps of a moving image encoding method as claimed in claim 7.

15. A non-transitory computer-readable storage medium storing a program for causing a computer to execute the steps of a moving image encoding method as claimed in claim 13.

* * * * *